US010644309B2

(12) United States Patent
Do et al.

(10) Patent No.: US 10,644,309 B2
(45) Date of Patent: May 5, 2020

(54) LIF-EMBEDDED SIG POWDER FOR LITHIUM ION BATTERY

(71) Applicant: XG Sciences, Inc., Lansing, MI (US)

(72) Inventors: Inhwan Do, East Lansing, MI (US); Hong Wang, Troy, MI (US)

(73) Assignee: XG Sciences, Inc., Lansing, MI (US)

( * ) Notice: Subject to any disclaimer, the term of this patent is extended or adjusted under 35 U.S.C. 154(b) by 303 days.

(21) Appl. No.: 15/517,417

(22) PCT Filed: Oct. 5, 2015

(86) PCT No.: PCT/US2015/053939
§ 371 (c)(1),
(2) Date: Apr. 6, 2017

(87) PCT Pub. No.: WO2016/057369
PCT Pub. Date: Apr. 14, 2016

(65) Prior Publication Data
US 2018/0241033 A1    Aug. 23, 2018

Related U.S. Application Data

(60) Provisional application No. 62/060,319, filed on Oct. 6, 2014.

(51) Int. Cl.
H01M 4/36    (2006.01)
H01M 4/38    (2006.01)
(Continued)

(52) U.S. Cl.
CPC ............. *H01M 4/366* (2013.01); *C01B 32/19* (2017.08); *C01B 33/02* (2013.01); *H01M 4/134* (2013.01);
(Continued)

(58) Field of Classification Search
CPC ........ C09D 1/00; H01M 4/133; H01M 4/134; H01M 4/386; H01M 4/625; H01M 4/366; (Continued)

(56) References Cited

U.S. PATENT DOCUMENTS

2004/0150312 A1    8/2004    McElrath et al.
2005/0106098 A1    5/2005    Tsang et al.
(Continued)

FOREIGN PATENT DOCUMENTS

WO    WO-2011/057074 A2    5/2011
WO    WO-2012/154183 A1    11/2012

OTHER PUBLICATIONS

Wu et al ("A LiF Nanoparticle-Modified Graphene electrode for High-Power and High-Energy Lithium Ion Batteries". Adv. Functional Materials. 2012. 22. (3290-3297)) [Year 2012].*
(Continued)

*Primary Examiner* — Stephen J Yanchuk
(74) *Attorney, Agent, or Firm* — Blue Filament Law PLLC

(57) ABSTRACT

A nanographitic composite for use as an anode in a lithium ion battery is described, including: particles of an electroactive material; and a coating over the electroactive particles comprising a plurality of graphene nanoplatelets and an SEI modifier additive wherein the SEI modifier additive is a dry powder that is disposed over at least part of the surface of the electroactive material particles.

49 Claims, 7 Drawing Sheets

(51) Int. Cl.
| | |
|---|---|
| *H01M 4/62* | (2006.01) |
| *H01M 4/134* | (2010.01) |
| *H01M 4/1395* | (2010.01) |
| *C01B 32/19* | (2017.01) |
| *C01B 33/02* | (2006.01) |
| *H01M 4/583* | (2010.01) |
| *H01M 4/587* | (2010.01) |
| *H01M 10/0525* | (2010.01) |
| *H01M 4/02* | (2006.01) |
| *H01M 10/052* | (2010.01) |

(52) U.S. Cl.
CPC ......... *H01M 4/1395* (2013.01); *H01M 4/386* (2013.01); *H01M 4/587* (2013.01); *H01M 4/5835* (2013.01); *H01M 4/62* (2013.01); *H01M 4/621* (2013.01); *H01M 4/625* (2013.01); *H01M 10/0525* (2013.01); *C01P 2004/61* (2013.01); *C01P 2004/62* (2013.01); *C01P 2004/80* (2013.01); *C01P 2006/11* (2013.01); *C01P 2006/12* (2013.01); *C01P 2006/40* (2013.01); *H01M 10/052* (2013.01); *H01M 2004/021* (2013.01); *H01M 2004/027* (2013.01)

(58) Field of Classification Search
CPC .... H01M 4/587; H01M 4/5835; H01M 4/621; H01M 4/1395; H01M 10/0525; H01M 2004/027; C01B 33/02; C01P 2004/021; C01P 2004/61; C01P 2004/80; C01P 2004/62; C01P 2006/11; C01P 2006/12; C01P 2006/40
See application file for complete search history.

(56) References Cited

U.S. PATENT DOCUMENTS

| | | |
|---|---|---|
| 2006/0134524 A1 | 6/2006 | Nakai et al. |
| 2009/0020734 A1 | 1/2009 | Jang et al. |
| 2009/0117467 A1 | 5/2009 | Zhamu et al. |
| 2011/0311869 A1 | 12/2011 | Oh et al. |
| 2012/0064409 A1 | 3/2012 | Zhamu et al. |
| 2012/0261610 A1 | 10/2012 | Paulsen et al. |
| 2012/0282527 A1 | 11/2012 | Amine et al. |
| 2012/0288750 A1 | 11/2012 | Kung et al. |
| 2013/0260152 A1 | 10/2013 | Murray et al. |
| 2013/0309495 A1 | 11/2013 | Do et al. |
| 2014/0255785 A1 | 9/2014 | Do et al. |
| 2015/0086860 A1* | 3/2015 | Yokoi .................. H01M 4/133 429/188 |

OTHER PUBLICATIONS

Chen, X., et al., "Structural and mechanical characterization of platelet graphite nanofibers," Carbon, vol. 45, Issue 2, Feb. 2007, pp. 416-423.

Geim, A. K. And Novoselov, K. S., "The rise of graphene," Nature Materials, vol. 6, Mar. 1, 2007, pp. 183-191.

International Search Report and Written Opinion dated Jan. 27, 2016, by the U.S. Patent and Trademark Office as International Searching Authority for the International Application No. PCT/US2015/053939, 15 pages.

Mo, Z., et al., "Preparation and characterization of a PMMA/Ce(OH)3, Pr2O3/graphite nanosheet composite," Polymer, Dec. 12, 2005, vol. 46 Issue 26, pp. 12670-12676.

Novoselov, K. S., et al., "Two-dimensional atomic crystals," PNAS, Jul. 26, 2005, vol. 102, No. 30, pp. 10451-10453.

* cited by examiner

LIF-EMBEDDED SIG POWDER FOR LITHIUM ION BATTERY

CROSS-REFERENCE(S) TO RELATED APPLICATIONS

This application is a national stage application of International Application No. PCT/US15/53939 filed Oct. 5, 2015, which claims priority to U.S. Provisional Application No. 62/060,319, filed Oct. 6, 2014, the contents of which are incorporated by reference herein in its their entirety.

INCORPORATION BY REFERENCE

All patents, patent applications and publications cited herein are hereby incorporated by reference in their entirety in order to more fully describe the state of the art as known to those skilled therein as of the date of the invention described herein.

BACKGROUND

This invention relates to graphene nanoplatelet composites with electroactive materials.

Lithium-ion batteries (LIB) are being pursued for a variety of applications including electric or hybrid electric vehicles (EV & HEV), consumer electronics, grid energy storage systems and distributed power generation units. The success of LIB in such markets strongly depends on the cost, energy density, power capability, cycle life, and safety of the battery cells, which are largely dominated by the electrode materials used. While LIB technologies have advanced significantly since their first commercialization in the early 90's, they are not keeping pace with the ever increasing demand for batteries with higher energy storage capacities. For example, DOE EV Everywhere program defines an EV cell target of 400 Wh/kg with 1000 cycles, at cost of ownership comparable to conventional ICE vehicles. This target cannot be met with current LIB chemistries, especially with graphite as the anode. Because of graphite's low capacity, a cell with a carbon-based anode can reach at most 200-250 Wh/kg, depending on the type of cathode. Therefore, there is a great need to develop advanced anodes for future generation LIB.

Silicon (Si) is considered as the most promising anode material due to its high capacity and proper working voltage. Theoretically, Si can provide up to 4200 mAh/g of Lithium (Li) storage capacity. It can be lithiated in the potential range of 0.0~0.4 V, which provides the capability to make a high energy density device when paired with an appropriate cathode. Nevertheless, replacing traditional graphite anode materials with Si has proven to be very challenging. Two major barriers have hindered the development of Si-based anodes for commercial applications, especially for use in EV batteries:

(i) Poor cycle life. Si tends to pulverize during cycling as a result of substantial volume change (up to 400%) during charging/discharging of the batteries, which in turn leads to the loss of electrical contact or even disintegration of both Si particles and the electrode coating.

(ii) High synthesis cost. Most of the processes used for the synthesis of Si-based anodes utilize expensive chemical precursors, exotic synthesis methods, or capital-intensive processes. Furthermore, they are usually not suitable for high-volume production. As a result, none of these processes has been successfully commercialized.

In order to solve the cycling stability problems, researchers have taken various approaches including (a) using nano particles, nanotubes, nano-spheres, and nanowires, (b) applying carbon coating by various methods, or (c) designing porous Si structures. While the capacity, rate capability, and cycling stability have been improved to a certain extent with these processes, the materials usually have relatively low first cycle reversibility and in general still cannot meet the life requirements for most commercial applications.

Silicon particles can be coated by carbon layers via chemical vapor deposition and carbonization processes using carbon precursors such as pitch, glucose, sugar, polyacrylonitrile, polyvinyl alcohol etc. In such coating processes, a carbon thin film 110 on Si 120 surface forms a continuous phase, as illustrated in FIG. 1A, which results in retarding electrolyte penetration and thus $1^{st}$ cycle efficiency is generally low.

Other approaches involve the coating of silicon particles 140 with graphene materials 130 such as graphenes reduced from graphite oxide and exfoliated graphene, as illustrated in FIG. 1B. In this case, the graphene size is larger than the Si size and one graphene particle makes contact with more than one Si particles. This results in a somewhat rigid framework that cannot easily accommodate the significant volume change during cycling.

The high cost may still be a major obstacle preventing the use of Si as a commercial anode even if the performance is improved. Therefore, a high-performance and low-cost Si-based anode remains a lofty goal of the battery industry.

Further, it has been difficult to build stable full cells with Si-based anodes fabricated with Si nanoparticles, Si nanowire, Si nanotube, Si-alloy, Si/Carbon, and Si/Graphene composite mainly due to continuous growth of a SEI layer and side-reactions between Si and electrolytes in lithiation/delithiation process over extended cycles.

Use of SEI modifier additives to the silicon graphene nanographitic anodes, such as, but not limited to LiF, have been demonstrated as helping improve full cell stability and can be beneficial for stable cell performance.

SUMMARY OF INVENTION

In an aspect, a nanographitic composite for use as an anode in a lithium ion battery includes particles of an electroactive material; and a coating over the electroactive particles comprising a plurality of graphene nanoplatelets and an SEI modifier additive wherein the SEI modifier additive is a dry powder that is disposed over at least part of the surface of the electroactive material particles.

In one or more embodiments of the nanographitic composite, the coating includes a mixture of the graphene nanoplatelets and SEI modifier additive.

In one or more embodiments of the nanographitic composite, the coating includes an inner layer of SEI modifier additive and an outer layer of graphene nanoplatelets, wherein the graphene nanoplatelets coat at least a portion of the additive modified electroactive particles to form a layer made up of overlapping graphene nanoplatelets.

In any of the preceding embodiments of the nanographitic composite, the graphene nanoplatelets forms a contact with at least a portion of the electroactive particle.

In any of the preceding embodiments of the nanographitic composite, the SEI modifier additive includes LiF.

In any of the preceding embodiments of the nanographitic composite, the graphene nanoplatelets have a thickness of 0.34 nm to 50 nm and a lateral dimension of less than 900 nm.

In any of the preceding embodiments of the nanographitic composite, the SEI modifier additive results in formation of thin solid electrolyte interface layer that is discontinuous.

In some embodiments of the nanographitic composite, the SEI modifier additive results in formation of thin solid electrolyte interface layer that is continuous.

In any of the preceding embodiments of the nanographitic composite, the graphene nanoplatelets-coated nanoscale particles form agglomerates.

In any of the preceding embodiments of the nanographitic composite, the graphene nanoplatelets have a lateral dimension of less than 500 nm. In some embodiments of the nanographitic composite, the graphene nanoplatelets have a lateral dimension of 30 nm to 200 nm.

In any of the preceding embodiments of the nanographitic composite, the coating of graphene nanoplatelets comprises multiple layers of graphene nanoplatelets.

In any of the preceding embodiments of the nanographitic composite, the electroactive material is one or more material selected from the group consisting of silicon, tin, iron, magnesium, aluminum, lead, gold, silver, titanium, platinum, palladium, ruthenium, copper, nickel, rhodium and nickel and combinations thereof.

In any of the preceding embodiments of the nanographitic composite, electroactive material comprises silicon. In some embodiments of the nanographitic composite, the silicon is present in a range from 5 wt % to 90 wt % of the composite. In another embodiment of the nanographitic composite, the silicon is present in a range from 40 wt % to 70 wt % of the composite. In yet another embodiment of the nanographitic composite, the silicon is present in a range from 30 wt % to 70 wt % of the composite In any of the preceding embodiments of the nanographitic composite, the LiF is present in a range from 2 wt % to 30 wt % of the composite.

In any of the preceding embodiments of the nanographitic composite, the graphene is present in a range from 10 wt % to 40 wt % of the composite.

In any of the preceding embodiments of the nanographitic composite, the composite further comprises a conductive carbon additive. In some embodiments, the conductive carbon additive is selected from the group consisting of carbon black, acetylene black, carbon nanotube, carbon fiber, carbon nanohorn, carbon nanocoil and combinations thereof.

In any of the preceding embodiments of the nanographitic composite, the electroactive particle is present in a range from 5 wt % to 90 wt % of the composite.

In any of the preceding embodiments of the nanographitic composite, the surface area is in the range of 50 to 200 $m^2/g$.

In an aspect, an electrode for use as an anode in a lithium ion battery includes; (a) the nanographitic composite as described in any of the preceding embodiments; and (b) a binder.

In one or more embodiments of the electrode, further including a conductive additive. In some embodiments of the electrode, the conductive additive includes a graphene. In another embodiment of the electrode, the conductive additive is 2 to 20 wt % of the total electrode weight. In yet another embodiment of the electrode, the binder is 3 to 20 wt % of the total electrode weight.

In another aspect, a lithium ion battery includes an anode according to any of the preceding embodiments; a cathode; and an electrolyte disposed between and in ionic contact with the anode and the cathode.

In another aspect, a method of making a nanocomposite suitable for use in a lithium ion battery, includes: introducing an electroactive particle powder into a high energy dry mill, wherein the particles are of a micron-scale dimension; introducing an SEI modifier additive in the high energy dry mill as a dry powder, wherein the additive particles are of a micron-scale dimension and at least some of the SEI modifier additive gets disposed on the surface electroactive particle; introducing a graphite particle powder into the high energy dry mill, wherein the graphite particles are greater than 0.5 µm; and milling the electroactive particle powder with the SEI modifier additive and the graphite particle powder, to exfoliate the graphite and reduce the particle size of the electroactive particle; wherein the exfoliated size-reduced graphite coats the surface of the size-reduced electroactive particle, wherein the resultant nanocomposite has a bulk density of greater than 0.50 $g/cm^3$.

In one or more embodiments of the method of making a nanocomposite suitable for use in a lithium battery, the milling results in the reduction of the particle size of the electroactive material to less than 3 um and reduce the particle size of the graphite particle to less than 900 nm.

In another aspect, a nanographitic composite for use as an anode in a lithium ion battery, includes a plurality of composite particles including: an electroactive particle; a coating layer comprising an inner layer of graphene nanoplatelets that are tightly bound to the electroactive particle and an outer layer of graphene nanoplatelets that interact loosely with the inner layer of graphene nanoplatelets, wherein the nanographitic platelets covers at least a portion of the nanoscale particle to form a nanographitic layer; and an SEI modifier additive wherein the SEI modifier additive is a dry powder.

In one or more embodiments of the nanographitic composite, the SEI modifier additive is preferentially disposed at the interface of the electroactive particle and the inner layer of graphene nanoplatelets.

In one or more embodiments of the nanographitic composite, the SEI modifier additive is disposed in the outer layer of the graphene nanoplatelets surrounding the electroactive particle.

In any of the preceding embodiments of the nanographitic composite, the inner layer comprises a mixture of carbon, silicon and LiF.

In any of the preceding embodiments of the nanographitic composite, the inner layer is covalently bonded to the electroactive particle. In any of the preceding embodiments of the nanographitic composite, the covalent bond is a pi-bond or a partial pi-bond.

In any of the preceding embodiments of the nanographitic composite, the inner layer is bonded to the electroactive particle by van der Waals bond.

In any of the preceding embodiments of the nanographitic composite, the graphene nanoplatelets-coated nanoscale particles form agglomerates.

In any of the preceding embodiments of the nanographitic composite, the coating layer comprises multiple layers of graphene nanoplatelets.

In any of the preceding embodiments of the nanographitic composite, the electroactive particle is one or more selected from the group consisting of silicon, tin, iron, magnesium, aluminum, lead, gold, silver, titanium, platinum, palladium, ruthenium, copper, nickel, rhodium and nickel and combinations thereof.

In any of the preceding embodiments of the nanographitic composite, electroactive particle comprises silicon. In some embodiments of the nanographitic composite, wherein the silicon is present in a range from 10 wt % to 90 wt % of the composite. In one or more embodiments of the nanographitic composite, the composite further comprises a conductive carbon additive. In some embodiments of the nanographitic composite, the conductive carbon additive is selected from the group consisting of carbon black, acetylene black, carbon nanotube, carbon fiber, carbon nanohorn, carbon nanocoil and combinations thereof.

In another aspect, an electrode for use as an anode in a lithium ion battery, includes: (a) the nanographitic composite according to any of the preceding embodiments; and (b) a binder.

In one or more embodiments of the electrode, the electrode further includes a conductive additive.

In any of the preceding embodiments of the electrode, the conductive additive comprises a graphene.

In any of the preceding embodiments of the electrode, the conductive additive is 2 to 20 wt % of the total electrode weight.

In any of the preceding embodiments, the binder is 3 to 20 wt % of the total electrode weight.

In an aspect, a lithium ion battery includes: an anode according above description; a cathode; a separator spacing apart the anode and the cathode; and an electrolyte in contact with the anode and the cathode.

It is contemplated that any embodiment disclosed herein may be properly combined with any other embodiment disclosed herein. The combination of any two or more embodiments disclosed herein is expressly contemplated.

BRIEF DESCRIPTION OF THE DRAWING

The invention is described with reference to the following figures, which are presented for the purpose of illustration only and are not intended to be limiting.

In the Drawings.

DETAILED DESCRIPTION

Figure 1A:
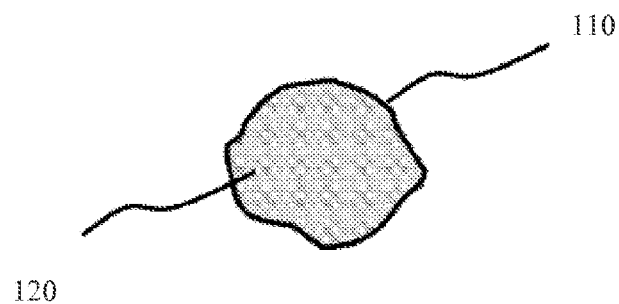
FIGS. 1A and 1B are illustrations of prior art approaches to combining silicon with carbon.
Figure 1B:
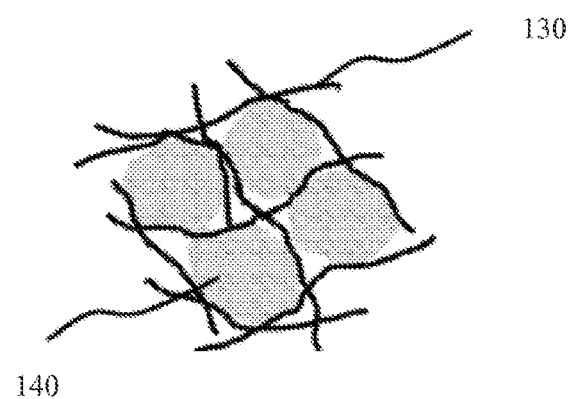

A nanographitic composite for use as a battery material in a lithium ion battery is described. The composite material includes nanoscale and/or microscale particles of an electroactive material that are coated with an SEI modifier additive material, and nanographitic platelets or graphene nanoplatelets. In one or more embodiments, the SEI modifier additive material is selected to effect the growth of the SEI layer on the electroactive material. In one or more embodiments, the SEI modifier additive material is selected from the group including LiF, $Li_2O$, $Li_2CO_3$, lithiumchloride (LiCl), lithium iodide (LiI), lithium metaborate ($LiBO_2$), lithium tetraborate ($Li_2B_4O_7$), lithium benzoate ($C_6H_5COOLi$), lithium bromide (LiBr), lithium phosphate (Li3PO4), lithium trifluoromethanesulfonate ($CF_3SO_3Li$), $Na_2CO_3$, $K_2CO_3$ and mixtures thereof.

In some embodiments, the SEI modifier additive material is coated on the electroactive particle, and nanographitic platelets or graphene nanoplatelets are coated over the SEI modifier additive material. By way of example, the composite electroactive material can be prepared by first coating the electroactive material with an SEI modified additive to cover at least a part of the surface area of the electroactive material. The SEI modifier additive coated electroactive material is subsequently coated with nanographitic platelets or graphene nanoplatelets. At least at some places the graphene forms a direct contact with the electroactive particle and the contact between the graphene and the electroactive material is sufficiently direct to allow the formation of a strong, robust interactions. In some embodiments the SEI modifier additive material is disposed between graphene and the electroactive material. In another aspect of the invention, the SEI modifier additive material mixed with graphene to form a composite layer over the electroactive material. In one or more embodiments, the SEI modifier additive material is selected to promote the growth of artificial SEI layer on the electroactive material. In one or more embodiments, the SEI modifier additive material is selected from the group including LiF, $Li_2O$, $Li_2CO_3$, lithiumchloride (LiCl), lithium iodide (LiI), lithium metaborate ($LiBO_2$), lithium tetraborate ($Li_2B_4O_7$), lithium benzoate ($C_6H_5COOLi$), lithium bromide (LiBr), lithium phosphate (Li3PO4), lithium trifluoromethanesulfonate ($CF_3SO_3Li$), $Na_2CO_3$, $K_2CO_3$ and mixtures thereof.

In some embodiments an electroactive particle is coated substantially with a layer of graphene nanoplatelets in which the SEI modifier additive is distributed randomly. By way of example, the composite electroactive material can be prepared by coating the electroactive material an SEI modified additive and nanographitic platelets or graphene nanoplatelets at the same time. In one or more embodiments, the SEI modifier additive material is selected to promote the growth of artificial SEI layer on the electroactive material. In one or more embodiments, the SEI modifier additive material is selected from the group including LiF, $Li_2O$, $Li_2CO_3$, lithiumchloride (LiCl), lithium iodide (LiI), lithium metaborate ($LiBO_2$), lithium tetraborate ($Li_2B_4O_7$), lithium benzoate ($C_6H_5COOLi$), lithium bromide (LiBr), lithium phosphate (Li3PO4), lithium trifluoromethanesulfonate ($CF_3SO_3Li$), $Na_2CO_3$, $K_2CO_3$ and mixtures thereof. By substantially coated, it is meant that at more than 50%, or at least 70%, or at least 80%, to at least 90% or at least 95% of the surface area of the electroactive particle is coated with the a coating of graphene nanoplatelets in which the SEI modifier additive is distributed randomly.

The graphene nanoplatelets used in any of the embodiments are of a relatively small dimension, that is, the graphene nanoplatelets are nanoscale and are not of the lengths typically associated with graphitic platelets or flakes (which are greater than 1 μm and typically greater than 10 μm). The electroactive particle has an average particle size that is larger than or of a comparable size to the average lateral dimension of the graphene nanoplatelets. The size requirements are an unexpected result as the art teaches further reduction in particle size of the electro active material is desirable and we have discovered the relatively larger electro active material with smaller nanographic platelets has improved capacity and cycle life. In one or more embodiments, a longest lateral dimension of the graphene nanoplatelets is less than a longest lateral dimension of the electroactive particle. In one or more embodiments, a longest lateral dimension of the graphene nanoplatelets is less than 50% of a longest lateral dimension of the electroactive particle. In one or more embodiments, a longest lateral dimension of the graphene nanoplatelets is less than 25% of a longest lateral dimension of the electroactive particle. In one or more embodiments, a longest lateral dimension of the graphene nanoplatelets is less than 10% of a longest lateral dimension of the electroactive particle.

In some embodiments, the electroactive particle, e.g., a silicon particle decorated with the SEI modifier additive, is substantially completely coated by the nanographene coating. By substantially completely coated, it is meant that at more than 50%, or at least 70%, or at least 80% to at least 90% or at least 95% of the surface area of the electroactive particle is coated with the graphene nanoplatelet layer. The remaining area may be uncoated or it may interact with graphene sheets or flakes of larger (longer) dimensions. The smaller graphene nanoplatelets are able to surround and attach to the electroactive particle to form a nanographitic layer made up of overlapping graphene nanoplatelets. Two-dimensional and flexible graphene nanoplatelets wrap around electroactive particles, accommodate the dimensional change of electroactive particles during electrochemical cycling, and help maintain electric contact between particles and/or other components in the electrode coating.

In one or more embodiments, the nanographene platelets form a strong association with the surface of the electroactive particle. The graphene nanoplatelets can be physically attached, van der Walls bonded or chemically bonded to the surface of the electrochemical particle. In certain embodiments, the nanocomposite includes covalent bonding of the graphene carbon to the surface of the electroactive material through pi-bonds or partial pi-bonds. In other embodiments, the carbon from the graphene can diffuse into the electroactive particle to form a layer of mixed carbon and electroactive material. The region can be amorphous, disordered, crystalline, or can include a compound formed between the electroactive material and carbon.

In one or more embodiments, the graphene nanoplatelets can stack or overlap in the coating and can form multi-layer discontinuous or continuous coatings. In one or more embodiments, the graphene nanoplatelets are arranged around the electroactive particle to form an inner graphene layer that is tightly bound to the electroactive core, for example, by covalent bonding and/or formation of interdiffusion regions that contain both carbon and electroactive material, and a loosely associated graphene layer assembled, for example, by van der Waals attraction between graphene nanoplatelets. The graphene nanoplatelet layers can be made up of stretched or tangled graphene layers.

In one or more embodiments, the SEI modifier additive particles can vary from 5 nm to 1 µm depending on depositing method and processing time used in the processing of the particles. In one or more embodiments the SEI modifier additive particles can be spherical and irregular in shape. In one or more embodiments, the SEI modifier additive particles may be present as individual nanoclusters on the surface of the electroactive material, the graphene surface or both. In one or more embodiments, the SEI modifier additive particles may be present as agglomerates of the individual nanoclusters on the surface of the electroactive material, the graphene surface or both.

Figure 2A:
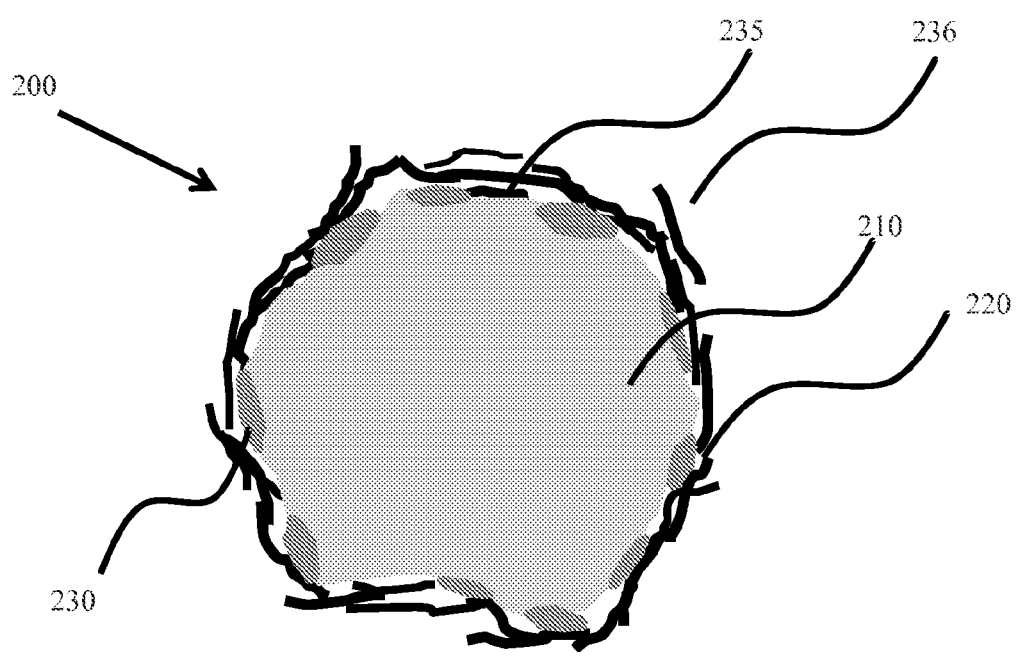
FIGS. 2A and 2B are a schematic illustration of a nanographitic composite according to one or more embodiments

Because the graphene nanoplatelets are relatively short and assemble by stacking on one another, the layer is permeable to electrolyte. The coating provides electrolyte access to the electroactive particle in the core, while robustly adhering to the electroactive particle. Advantageously, the graphene nanoplatelet layer is capable of accommodating the expansion and contraction of the electroactive particle during electrochemical cycling without loss of electrical conductivity or mechanical degradation of the composite. FIG. 2A is a schematic illustration of an SEI modifier additive embedded nanographitic according to one or more embodiments. According to one or more embodiments, an example of such a composite is silicon-nanographitic or nSiG composite. The SEI modifier additive embedded nSiG composite 200 is in form of Si particle 210 covered by SEI modifier additive material 220 such that at least part of the surface of the Si particle is covered by the SEI modifier additive material 220. The SEI modifier additive material according to one or more embodiments is LiF; however other SEI modifier additive materials can be used. The LiF embedded Si particle is coated with multilayers of many graphene nanoplatelets 230. As can be seen, the Si particle is much larger than the lateral dimensions of the graphene nanoplatelets. In one or more embodiments, a longest lateral dimension of the graphene nanoplatelets is less than a longest lateral dimension of the silicon particle. In one or more embodiments, a longest lateral dimension of the graphene nanoplatelets is less than 50% of a longest lateral dimension of the silicon particle. In one or more embodiments, a longest lateral dimension of the graphene nanoplatelets is less than 25% of a longest lateral dimension of the silicon particle. In one or more embodiments, a longest lateral dimension of the graphene nanoplatelets is less than 10% of a longest lateral dimension of the silicon particle. In one or more embodiments, the graphene forms a coating around the electroactive particle made up of the electroactive core, e.g., Si, and the SEI modifier additive, e.g., LiF. The coating can be a continuous coating around the electroactive particle. In certain embodiments, more than 50%, or at least 70%, or at least 80% to at least 90% or at least 95% of the surface area of the electroactive particle is coated with the graphene nanoplatelet layer.

In certain embodiments, a portion of the graphene nanoplatelets, e.g., nanoplatelet 235, can form a strong interaction with the surface of the silicon particle 210. As noted above, this interaction can be, among others, a covalent interaction between the carbon and silicon or it can be interdiffusion or mixing of the silicon and carbon. Other moieties, such as oxygen, may also be involved in the formation of the strong interaction between the two components. In certain embodiments, a portion of the graphene nanoplatelets, e.g., nanoplatelet 236, forms a looser association or interaction with the surface of the silicon particle 210. Such association can be due, among other reasons, to van der Waals attractive forces between the graphene nanoplatelets and the silicon.

In one or more embodiments, the electroactive material is present in a range from 5 wt % to 90 wt % of the composite. In one or more embodiments, the electroactive material is present in a range from 5 wt % to 20 wt % of the composite. In one or more embodiments, the electroactive material is present in a range from 5 wt % to 40 wt % of the composite. In one or more embodiments, the electroactive material is present in a range from 20 wt % to 70 wt % of the composite. In one or more embodiments, the electroactive material is present in a range from 40 wt % to 70 wt % of the composite. The relative proportions of the electroactive material and graphene can be selected to provide a target energy density or to provide a desired electronic conductivity in the nanocomposite. In embodiments in which the graphene proportion is large, there may be excess graphene that is not directly associated with the electroactive particle in the manner described hereinabove. In this case, the graphene-coated electroactive particles may be embedded in a matrix of graphene. The matrix graphene may be larger in size than the nanographene platelets that coat the electroactive particles. Similarly, in embodiments in which the graphene proportion is low, the coating on the electroactive particles may not completely cover the underlying electroactive particle surface. Nonetheless, it is expected that the graphene nanoplatelet layer covers at least a portion of the electroactive particle surface area.

In one or more embodiments, the SEI modifier additive is present in the range from 0.5 wt % to 50 wt % of the composite. In one or more embodiments, the SEI modifier additive is present in a range from 5 wt % to 40 wt % of the composite. In one or more embodiments, the SEI modifier additive is present in a range from 10 wt % to 30 wt % of the composite.

Figure 2B:
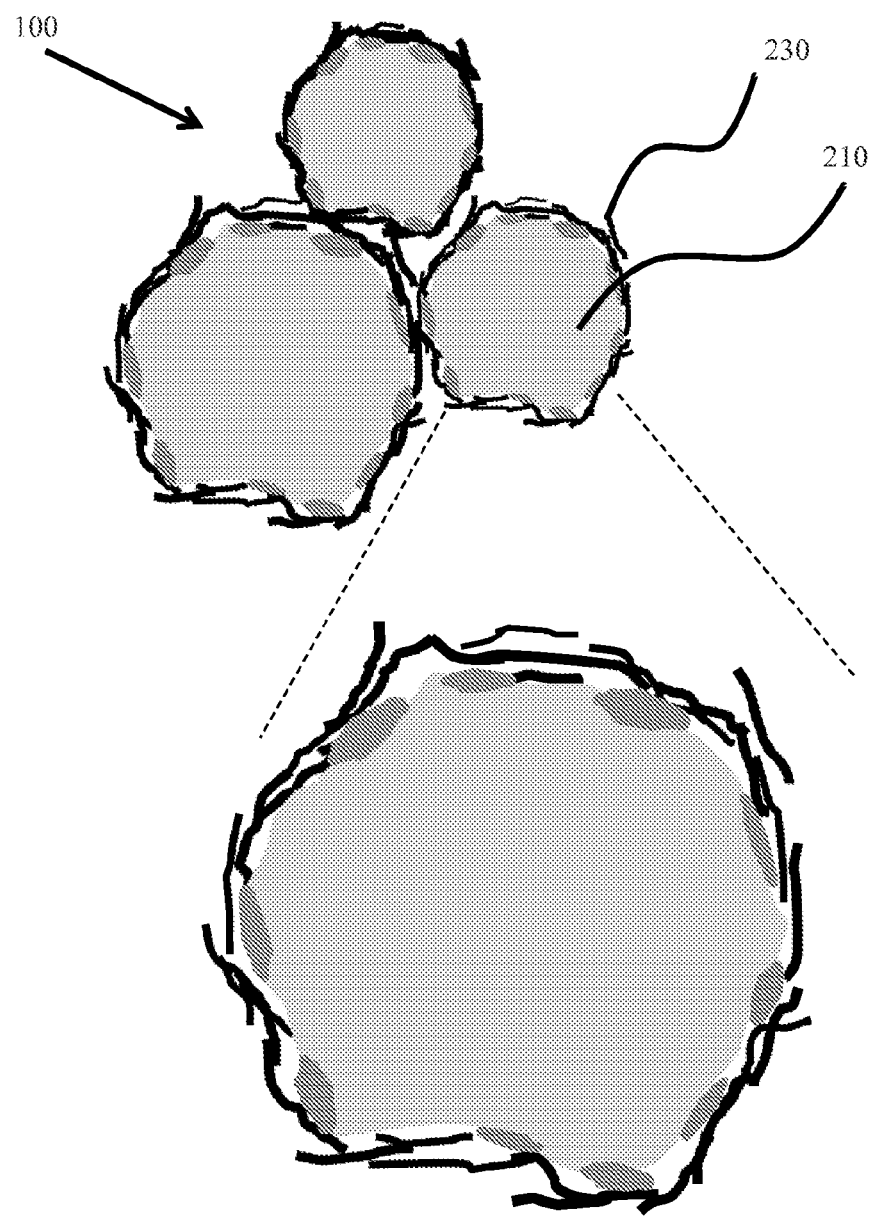

FIG. 2B is a schematic illustration showing a cluster or agglomeration of SEI modifier additive embedded nanographitic composite (in which common elements are similarly labeled). Agglomerates can range in size depending on the size of the silicon particles. In one or more embodiments, the agglomerate size is greater than 100 nm; in other embodiments, the agglomerate size is about 1 μm; in other embodiments, the agglomerate size is about 3 μm; in other embodiments, the agglomerate size is about 10 μm; in other embodiments, the agglomerate size is about 30 μm.

In certain embodiments, the electroactive particle (shown here as Si as an example) can range in particle size from 10 nm to 3 μm. Typically, the electroactive particle is about 500 nm to about 3 μm, or about 0.5-2 μm, with a tail into the smaller particle size. As is discussed below in relation with the methods used to make the nanocomposite, the range of particle size can be quite large. Due, in part, to the large particle size distribution, a portion of the electroactive particle sizes may be smaller than the graphene nanoplatelets and a portion of the electroactive particles may be larger than the graphene nanoplatelets; however, the predominant number of nanocomposite particles will have the longest lateral dimension of the graphene nanoplatelets less than the longest lateral dimension of the electroactive particle. By predominant as used herein, it is meant that more than 50%, or more than 60% or more than 70% or more than 80% or more than 90%, or more than 95% of the electroactive particles have a longest lateral dimension that is large than the nanographene platelets coating the particles.

The electroactive particle is made using an electrochemically active material (other than carbon) that is capable of taking up or intercalating lithium ions. The electrochemically active material can be metals or metalloids such as silicon (Si), germanium (Ge), tin (Sn), lead (Pb), antimony (Sb), bismuth (Bi), zinc (Zn), aluminum (Al), and cadmium (Cd). The electrochemically active material can be alloys or intermetallic compounds of Si, Ge, Sn, Pb, Sb, Bi, Zn, Al, or Cd, stoichiometric or non-stoichiometric with other elements. The electrochemically active material can be oxides, carbides, nitrides, sulfides, phosphides, selenides, tellurides, antimonides, or their mixtures (e.g., co-oxides or composite oxides) of Si, Ge, Sn, Pb, Sb, Bi, Zn, Al, Fe, or Cd. In one or more embodiments, the electroactive material is one or more metal selected from the group consisting of silicon, tin, iron, magnesium, aluminum, lead, gold, silver, titanium, platinum, palladium, ruthenium, copper, nickel, rhodium and nickel and combinations thereof.

The size of the graphene nanoplatelets can be less than 900 nm. In certain embodiments, the graphene nanoplatelets can be less than 500 nm. In certain embodiments, the nanosized graphene nanoplatelets are in a range of 10 nm to 900 nm or in a range of 10 nm to 700 nm. In other embodiments, the nanosized graphene platelets are in a range of 30 nm-200 nm. In some embodiments, the nanosized graphene platelets have a thickness of 0.34 nm to 50 nm or a thickness of 0.34 nm to 5 nm or a thickness of less than 2 nm. Hence, for example, one single electroactive particle with 1 μm diameter may be covered by 10~1000 nanosized graphite particles. The graphene nanoplatelets can have a relatively narrow aspect ratio, e.g., greater than graphite. Aspect ratios above 5 and below 500 are preferred and more preferred are aspect ratios above 10 and below 100. Aspect ratio as used herein refers to (length, width)/width. For an exemplary nanographitic composite, the surface area of graphene is above 300 m2/g. In certain embodiments, the overall surface area of the nanographitic composite is greater than 50 m2/g, or greater than 100 m2/g, or between 50 m2/g and 200 m2/g. In certain embodiments, the overall surface area of the nanographitic composite is greater than 50 m2/g, or greater than 100 m2/g, or between 50 m2/g and 200 m2/g.

Graphene has superior electrical and thermal conductivities, excellent mechanical strength, and good flexibility with a thin 2-dimensional morphology. As a bulk material, graphene nanoplatelets, which are a stacking of a few layers of graphene possess many of these desirable properties. In one or more embodiments, graphene nanoplatelets are built into the composite structure to mitigate the expansion and contraction of Si particles. Due to the compact assembly of the graphene nanoplatelets around the core particle, the bulk density of the materials is high as compared to prior art composites made using larger graphene sheets or flakes. In one or more embodiments, the tap density of the nanocomposite is greater than 0.8 g/cm3. Tap density can be measured using techniques that are well-known to those of skill in the art. Exemplary methods for measuring tap density include ASTM D7481-09.

Without being bound by any particular mode of operation, it is hypothesized that the graphene nanoplatelets may form strong interactions with the electroactive particle, e.g., silicon, for example, by covalent bonding between the two. In one or more embodiments, the nanographitic platelets are covalently bonded to the electroactive material by pi bonds (or partial pi bonds). In one or more embodiments, the graphene forms a diffusion layer with the electroactive particle to create an interlayer region containing both carbon and the electroactive material. The graphene nanoplatelets interact with one another through weaker interactions, such as van der Waals interactions. Thus, the nanocomposites contain an inner carbon-containing layer that strongly interacts with the electroactive particle and an outer layer of graphene that is loosely associated with the underlying graphene layer. As expansion occurs, the graphene layers slide easily over one another, while the inner layer remains interactive with the silicon particle. Given that the graphene layers can glide easily due to weak Van der Waals force, a strong bond on one side and easy glide on the other side can make this material more adaptive to Si volume change. In addition, the surface graphene layers are stacked non-linearly, in an undulating or crimped fashion that can stretch or extend to accommodate the electroactive particle as it expands. This helps keep the integrity of the composite.

Figure 2C:
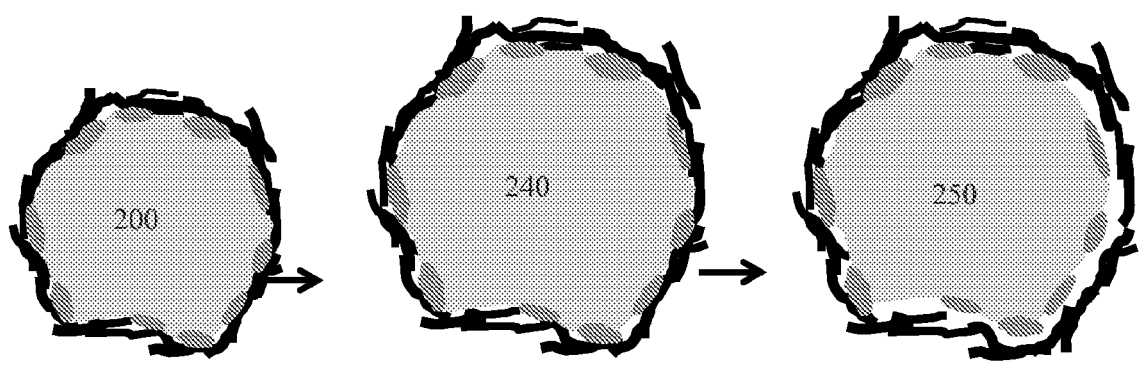
FIG. 2C is a schematic illustration of the expansion of a nanographitic composite during electrochemical cycling according to one or more embodiments.

The SEI modifier additive treated silicon/graphene composite can be integrated into the anode of a lithium ion battery to mitigate the severe expansion and contraction of Si particles during electrochemical cycling and provide a desirable reduction in SEI layer evolution during cycling. The graphene nanoplatelets provide a large contact area with Si particles and their flexibility helps accommodate the volume change of Si particles during the charging and discharging of the battery. FIG. 2C is a schematic illustration showing the advantageous properties of the nanographitic composite during an expansion event, such as during electrochemical cycling. The nanocomposite 100 includes a coated particle as prepared according to compositing methods, for example, as are described herein below. During lithiation, lithium ions are taken up by the silicon particle, causing it to expand 240. The multilayer of graphene nanoplatelets is held in place, at least in part, via the strong interaction of the first graphene nanoplatelets with the surface of the silicon particles and the van der Waals interaction of the multiple layers of graphene nanoplatelets. When the Si phase is expanded by the lithiation process, the graphene coating can be thinned, but the graphene nanoplatelets still keep their connection due to the multilayer structure of the graphene nanoplatelet coating. When Si is contracted in delithiation process, the interaction between the Si surface and graphitic coating layer is robust and can accommodate the size reduction, as shown for nanocomposite 250. The overlapping formation and interparticle attraction provides a support so that the interconnection of graphitic particles 130 does not collapse or break up and the electronic connectivity is sustained. Due to the relatively good connectivity of the coating with the silicon particle and its robustness on expansion and contraction, coulombic efficiency of nSiG nanocomposite remains over 95% after the 2nd cycle, which is rare for any Si composites coated by carbon and/or graphene.

Without being bound by theory, it is further hypothesized that the SEI modifier incorporated in the silicon/graphene composites can suppress side reaction of Si-electrolyte, alter SEI layer structures, and form thin and Li-conductive SEI which helps improve both lithium ion half-cell and full cell stability. It is also anticipated that SEI modifier promotes a uniform formation of the SEI which inhibits the formation of a thick SEI around the silicon/graphene composite. Additionally, the SEI modifier may enhance the adhesion of the SEI between the electroactive particles and/or the graphene phase. This may result in the improved stability of the SEI thus formed.

In another aspect, the SEI modifier additive embedded nanographitic composite can include other additives selected to impart additional desirable features to the nanocomposite. Suitable additives include metallic additives, and conductive additives, such as carbon blacks, carbon nanotubes and other graphene additives to improve the electronic connectivity within the composite.

In another aspect, a method of making a SEI modifier additive embedded nanographitic composite suitable for use as a battery material is described. As noted above, SEI modifier additive embedded nanographitic composites using LiF as the SEI modifier additive, Si as the electroactive material and graphene sheets have been reported.

The process is carried out by first coating the electroactive material with the SEI modifier additive. In an embodiment, the coating of the electroactive material with the SEI modifier additive is carried out by mixing the dry powder of electroactive material with the SEI modifier additive by using a suitable method. Suitable methods for mixing can be chosen from, but not limited to, tumble blending, V-blending, ball milling etc. In another aspect of the embodiment, the coating of the electroactive material with the SEI modifier additive, such that at least a part of the surface of the electroactive material is covered by the SEI modifier additive material, is carried out after the milling for reduction of the particle size of the electroactive material has been accomplished. In yet another aspect of the embodiment, the electroactive material, which has been milled for reduction of particle size reduction in a first step, is coated with a mixture of SEI modifier additive and graphene in a subsequent step to form a layer of coating on the surface of electroactive particles that includes both graphene and SEI modifier additive material.

However, the composites obtained by using graphene sheets that span several or many electroactive particles do not give rise to the supporting and embracing network of nanographitic layer of the composites described herein. While it is possible to reduce the size of the large graphene sheets or platelets prior to compositing with the electroactive particles, the resultant nanoscale powder is difficult to handle and the dry powder mixing or even slurry mixing can be challenging due to agglomeration, transport of low bulk density, fluffy materials, increased risks of inhalation exposure, and the like. To avoid these prior art problems and to allow for the intimate contact between the electroactive particle and the graphene nanoplatelets, improved methods of making a graphitic nanocomposite include simultaneous size reduction and compositing of the component elements of the graphitic nanocomposite.

In one or more embodiments, a precursor graphite material and the SEI modifier embedded electroactive particles are introduced into an exfoliation apparatus that simultaneously (1) exfoliates the large graphite sheets into thinner graphenic layers, (2) reduces the graphite sheets to nanoscale dimensions, and (3) reduces the particle size of the SEI modifier embedded electroactive particle. Additional additives also can be included to the starting materials used to prepare the nanocomposite. Acetylene black, carbon black, or ultra-fine graphite particles may be used as an additional conductor additive. If the added particles are larger than or of a size commensurate with the graphitic nanoplatelets generated during this process, they are coated with the graphitic nanoplatelets. If the added particles are smaller than the silicon particles, they can become incorporated into the graphene nanoplatelet layers.

Figure 3:
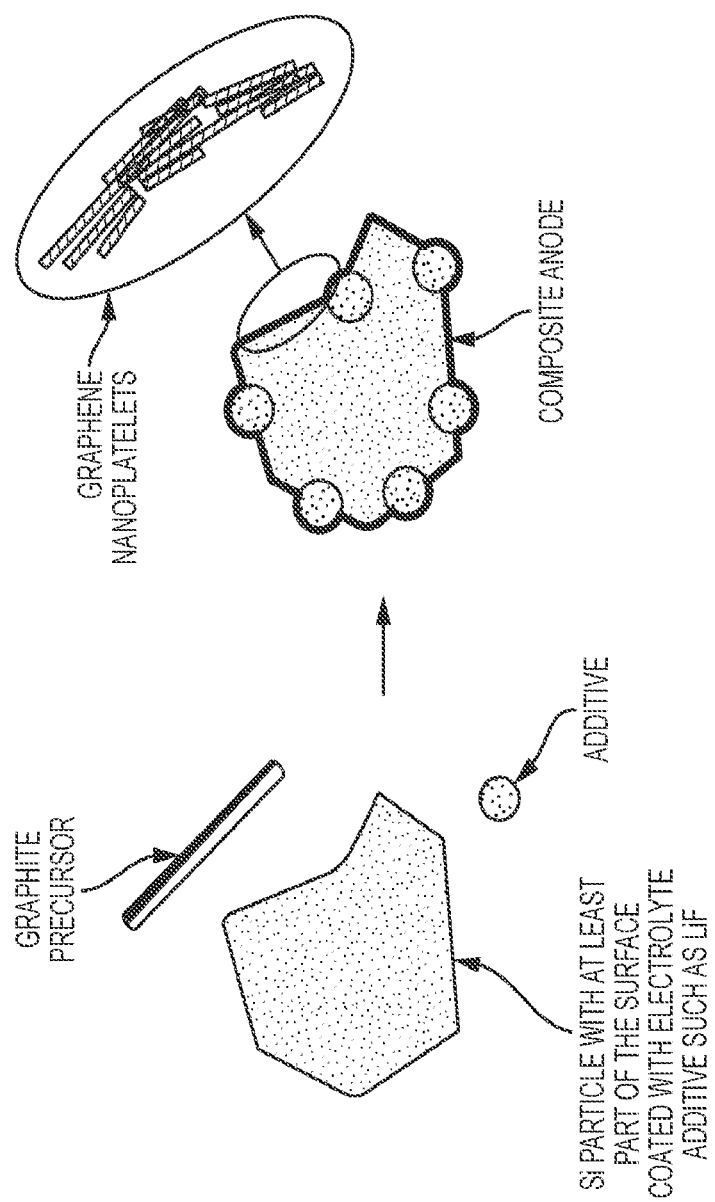
FIG. 3 is a schematic illustration of a process for preparing a nanographitic composite according to one or more embodiments.

This process is illustrated in FIG. 3. The precursor materials include LiF, graphite, optional additives and an electroactive particle such as silicon. The graphite can be conventional or natural graphite. For example, graphite having a lateral dimension on the order of 5 µm to 800 µm can be used. The precursor electroactive particle can have a size of 100 µm or less. In some embodiments, particle sizes of 10 µm or less, or particle sizes of 5 µm or less can be used. In some embodiments, particle sizes of 3-10 µm, or particle sizes of 3-5 µm, or particle sizes of 0.5-2 µm can be used.

The precursor materials are introduced into an exfoliation apparatus, wherein the graphite is exfoliated and size-reduced, and the SEI modifier additive embedded electroactive particle is size-reduced Other methods of milling, grinding, or size reduction of particulates can be used to the extent that they effect exfoliation instead of pulverization. A suitable apparatus and method of milling is described in co-pending U.S. application Ser. No. 13/435,260, filed Mar. 30, 2012, which is incorporated in its entirety by reference.

In one embodiment, the starting SEI modifier additive embedded electroactive particle has a particle size of 3~10 μm and the particles are reduced to particles with a longest lateral dimension is about 500 nm to about 3 μm, or about 1-2 μm, with a tail into the smaller particle size. Because the electroactive particle size is reduced in a process that simultaneously forms the graphene nanoplatelets and assembles the graphene nanoplatelet layers around the electroactive particle, the particle size distribution of the electroactive particle can be large. In one or more embodiments, the size distribution of the electroactive particles can range from 10 nm to 3 μm. In one or more embodiments, the size distribution of the silicon particles can range from 10 nm to 3 μm in an nSiG nanocomposite.

In one or more embodiments, 300~500 μm natural graphite flake is used and nanographene having a thickness of between 0.34 nm and 50 nm, or a thickness of between 0.34 nm and 5 nm, and a lateral dimension of less than 900 nm is obtained. Graphene produced by media ball milling has very small particle size with a relatively high surface area. It is well-suited to make nano-composites or coatings by coating or admixing other particles. In addition, the high energy of the exfoliation process induces reaction between the graphene nanoparticles and the electroactive particle. While not limited to any specific mechanism or theory of operation, the graphene may form robust interactions such as covalent bonds or interdiffusion reactions with the electroactive material. In one or more embodiments, the interface may include intermetallic compounds formed by the reaction of the graphene with the electroactive particle. Metals or metal oxides can be coated or formed into composites with the high surface area, relatively low aspect ratio graphene. The expanded section in FIG. 3 shows the nanoscale graphene platelets that coat the electroactive particle. Additives introduced during the milling operation, will also be incorporated into the coating, or they can occupy interstitial spaces between particles. Further details on a method of dry milling powders while effecting exfoliation of graphite is described in co-pending U.S. application Ser. No. 13/474,860, filed May 18, 2012, which is incorporated in its entirety by reference.

The method thereby provides significant improvements in both performance and properties of the final product and in the methods used to make it. The method produces a nanoscale composite starting with nanoscale and/or microscale precursor materials. Thus, the materials handling is easier and there are lower health risks associated with handling of the precursor materials and final powder products.

In one aspect of the embodiment, a method is provided for preparation of a nanographitic composite including introducing an electroactive material powder into a high energy dry mill, wherein the powder particles are of a micron-scale dimension; introducing an SEI modifier additive dry powder into the high energy dry mill, wherein the SEI modifier additive particles are micron-scale particles; mixing the two components; then introducing a graphite powder into the high energy dry mill, wherein the powder particles are of a micron-scale dimension; and milling the SEI modifier additive embedded electroactive particle powder and the graphite particle powder, to exfoliate the graphite and reduce the particle size of the SEI modifier additive embedded electroactive particle to between 10 nm and 3 μm and reduce the particle size of the graphite particle to less than 900 nm, wherein the exfoliated size-reduced graphite coats the surface of the sized-reduced SEI modifier additive embedded electroactive particle, wherein the final composite includes agglomerates of the graphene coated particles that are greater than 1 μm, or greater than 2 μm, or greater than 3 μm, while also possessing components that are on the nanoscale. Thus, the material performance benefits of the nanocomposite are realized while providing the ease of materials handling of micron-scale powders.

In another aspect of the embodiment, a method is provided for preparation of a nanographitic composite including introducing an electroactive material powder, wherein the powder particles are of a micron-scale dimension, into a high energy dry mill and running the mill to reduce the particle size of the electroactive material to a particle size between 10 nm and 3 μm. Thereafter, introducing an SEI modifier additive dry powder and the graphite into the high energy dry mill, wherein the SEI modifier additive particles are micron-scale particles; and, wherein the graphite powder particles are of a micron-scale dimension; and milling the electroactive material with the SEI modifier additive and the graphite particle powder, to exfoliate the graphite and reduce the particle size of the graphite particle to less than 900 nm, wherein the exfoliated size-reduced graphite and the SEI modifier additive coats the surface of the size reduced electroactive particle, wherein the final composite includes agglomerates of the graphene coated particles that are greater than 0.5 μm, or greater than 1 μm, or greater than 2 μm, or greater than 3 μm, while also possessing components that are on the nanoscale. Thus, the material performance benefits of the nanocomposite are realized while providing the ease of materials handling of micron-scale powders.

Figure 4:
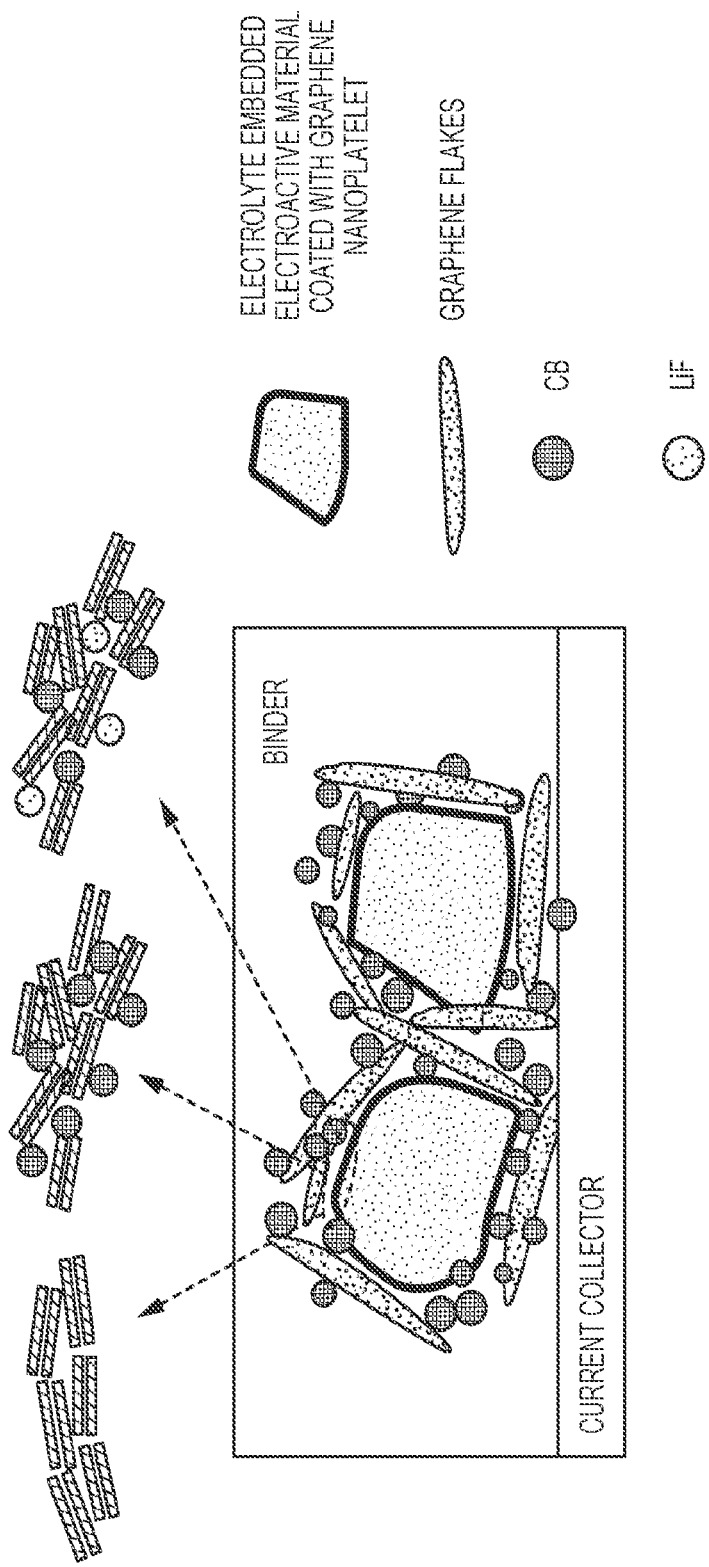
FIG. 4 is a schematic illustration of an anode incorporating the nanographitic composite according to one or more embodiments.

In another aspect, an anode is provided using the nanographitic composite wherein, the electroactive material is at least partly covered at the surface with an SEI modifier additive. An exemplary anode can be prepared by assembling the nanocomposite particles on a current collector and securing the particles, typically by using a binder, as illustrated in FIG. 4. The expanded view in FIG. 4 illustrates several exemplary embodiments of the nanocomposite that can be used in forming an anode. The graphitic nanoplatelet coating can consist substantially of graphitic nanoplatelets (left), or it can include carbon black (CB) as a conductive additive (center), or it can include both carbon black and LiF (right), by way of example. Suitable binders include those typically used in lithium ion batteries. Exemplary binders including polyacrylic acid (PAA), polyvinylidene fluoride (PVDF), carbomethoxy cellulose (CMC), PAA/CMC, CMC/SBR (styrene-butadiene rubber (SBR)), polyamide-imide (PAI), Sodium alginate, and lithium polyacrylate (LiPAA) could be used in a certain electrode formulation.

In addition to building graphitic nanoplatelets into the active composite anode, graphene flakes can also be included as a conductive additive in the electrode coating, as illustrated in FIG. 4. These graphene nanoplatelets are much larger than the nanoscale graphitic nanoplatelets used to form the graphitic nanoplatelet coating in the nanocomposite and can range from 5 to 50 μm, and more typically between 15 and 25 μm. The flexible and flake morphology of the graphene nanoplatelets is expected to provide better contact with the active particles and helps maintain the mechanical integrity of the electrode coating during the cycling. Moreover, if used together with carbon blacks and carbon nanotubes, graphene nanoplatelets additive may help create a conductive network with zero, one, and two-dimensional contacts throughout the electrode.

A further embodiment is a lithium ion battery incorporating such an anode, a cathode, a separator disposed between the anode and the cathode, and electrolyte in physical contact with both the anode and the cathode.

A lithium ion battery may include an anode featuring the nanographitic composite containing anode active particles which are embedded in an SEI modifier additive. A suitable SEI modifier additive, as mentioned above, is LiF. These can be readily mixed with graphene platelets or flakes to form graphene-enhanced particulates. Acetylene black, carbon black, or ultra-fine graphite particles may be used as an additional conductor additive. For the preparation of a cathode, the binder may be chosen from polytetrafluoroethylene (PTFE), polyvinylidene fluoride (PVDF), ethylene-propylene-diene copolymer (EPDM), or styrene-butadiene rubber (SBR), for example. Conductive materials such as electronically conductive polymers, meso-phase pitch, coal tar pitch, and petroleum pitch may also be used. Preferable mixing ratio of these ingredients may be 90 to 98% by weight for the particulates, and 2 to 10% by weight for the binder. There is no particularly significant restriction on the type of current collector, provided the material is a good electrical conductor and relatively corrosion resistant.

The separator may be selected from a synthetic resin nonwoven fabric, porous polyethylene film, porous polypropylene film, or porous PTFE film.

Electrolytes can be prepared from any known non-aqueous solvent which has been employed as a solvent for a lithium secondary battery A non-aqueous solvent mainly consisting of a mixed solvent comprising ethylene carbonate (EC) and at least one kind of non-aqueous solvent whose melting point is lower than that of aforementioned ethylene carbonate and whose donor number is 18 or less (hereinafter referred to as a second solvent) may be preferably employed Examples of preferred mixed solvent are a composition comprising EC and EMC; comprising EC, PC and EMC; comprising EC, EMC and DEC; comprising EC, EMC and DMC; and comprising EC, EMC, PC and DEC; with the volume ratio of EMC being controlled within the range of 30 to 80%. The electrolytic salt to be incorporated into a non-aqueous electrolyte may be selected from a group of lithium salts such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-meta-sulfonate ($LiCF_3SO_3$) and bis-trifluoromethyl sulfonylimide lithium [$LiN(CF_3SO_2)_2$].

The proposed Si/graphene composite anode is a potentially disruptive and enabling technology. Paired with a high energy cathode, it will help increase energy density of lithium ion battery from the present level of <200 Wh/kg to about 400 Wh/kg that is needed for electrified transportation in US and the world. High energy-density lithium ion batteries are also needed for other industries such as consumer electronics, utility, power electronics, and renewable energy.

Figure 5:
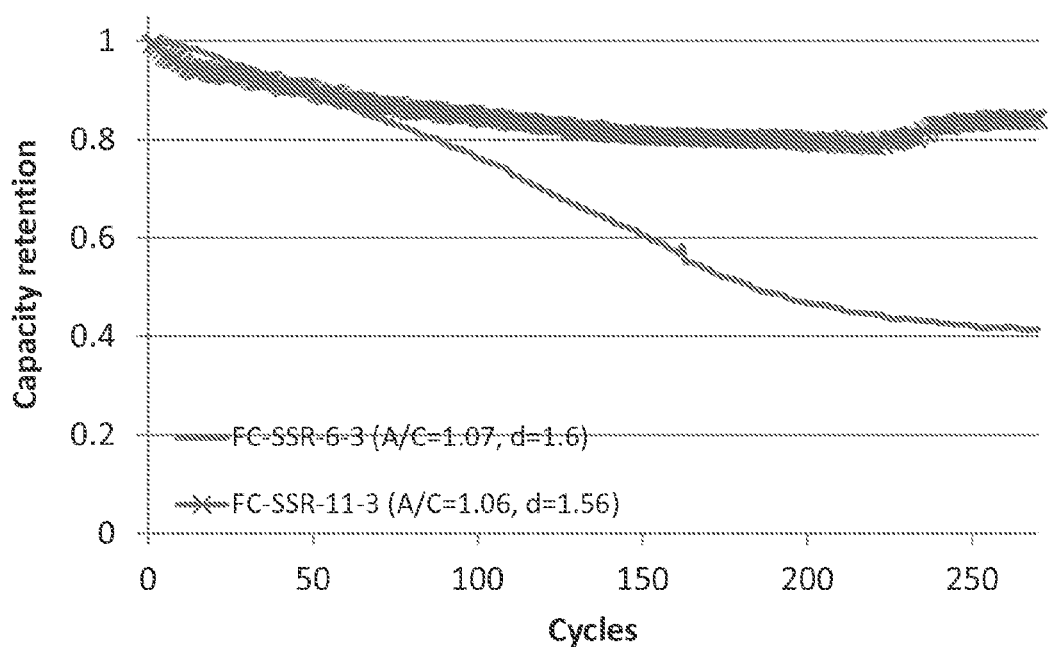
FIG. 5 is a plot comparing the capacity retention vs. cycle number, demonstrating the improvement in the stability of the full coin cell consisting of nickel cobalt aluminum oxide (NCA) cathode, PAA binder, and 1.5M $LiPF_6$ electrolyte containing fluoroethylene carbonate additive when LiF-embedded silicon/graphene anode is used as compared with a regular silicon/graphene anode.

FIG. 5 is a plot comparing the capacity retention vs. cycle numbers, demonstrating the improvement in the stability of the full coin cell consisting of NCA cathode, PAA binder, 1.5M $LiPF_6$ containing fluoroethylene carbonate additive electrolyte when LiF-embedded silicon/graphene is used as anode material (labelled FC-SSR-11-3 in FIG. 5) as compared with a regular silicon/graphene anode (labelled FC-SSR-6-3 in FIG. 5). When LiF-embedded silicon/graphene anode is used, initially the capacity retention decreases, which is similar to the decrease observed for the regular silicon/graphene anode. However, after around 100 cycles the capacity retention for the cell with the LiF-embedded silicon/graphene anode stabilizes at around 0.8 and remains at above 0.8 after 280 cycles. In contrast, the capacity retention of the full cell with the regular silicon/graphene anode continues to have a reduction and falls to 0.4 at around 250 cycles.

It will be appreciated that while a particular sequence of steps has been shown and described for purposes of explanation, the sequence may be varied in certain respects, or the steps may be combined, while still obtaining the desired configuration. Additionally, modifications to the disclosed embodiment and the invention as claimed are possible and within the scope of this disclosed invention.

What is claimed is:

1. A nanographitic composite for use as an anode in a lithium ion battery, comprising:
    particles of an electroactive material; and
    a coating over each of the electroactive particles comprising a first plurality of graphene nanoplatelets and a solid electrolyte interface (SEI) modifier additive wherein the first plurality of graphene nanoplatelets and one of the electroactive particles have covalent bonding, formation of interdiffusion regions that contain both carbon and electroactive material, or a combination thereof therebetween and the SEI modifier additive is a dry powder that is disposed over at least part of the surface of the electroactive material particles, and a second plurality of graphene nanoplatets each adhered to one of the SEI modifier particles or one of the first plurality of graphene nanoplatelets by van der Waals forces.

2. The nanographitic composite of claim 1, wherein the coating comprises a mixture of the first plurality of graphene nanoplatelets and the SEI modifier additive.

3. The nanographitic composite of claim 1, wherein the coating comprises an inner layer of the SEI modifier additive and an outer layer of the first plurality of graphene nanoplatelets, wherein the first plurality of graphene nanoplatelets coat at least a portion of the additive modified electroactive particles to form a layer made up of overlapping graphene nanoplatelets.

4. The nanographitic composite of claim 1, wherein the first plurality of graphene nanoplatelets forms a contact with at least a portion of the electroactive particle.

5. The nanographitic composite of claim 1, wherein in the SEI modifier additive is LiF.

6. The nanographitic composite of claim 1, wherein the first plurality of graphene nanoplatelets have a thickness of 0.34 nm to 50 nm and a lateral dimension of less than 900 nm.

7. The nanographitic composite of claim 1, wherein the SEI modifier additive results in a discontinuous layer.

8. The nanographitic composite of claim 1, wherein the SEI modifier additive results in a continuous layer.

9. The nanographitic composite of claim 1, wherein the first plurality of graphene nanoplatelets-coated nanoscale particles form agglomerates.

10. The nanographitic composite of claim 1, wherein the first plurality of graphene nanoplatelets have a lateral dimension of less than 500 nm.

11. The nanographitic composite of claim 1, wherein the first plurality of graphene nanoplatelets have a lateral dimension of 30 nm to 200 nm.

12. The nanographitic composite of claim 1, wherein the coating comprises multiple layers of graphene nanoplatelets.

13. The nanographitic composite of claim 1, wherein the electroactive material is one or more material selected from the group consisting of silicon, tin, iron, magnesium, aluminum, lead, gold, silver, titanium, platinum, palladium, ruthenium, copper, nickel, rhodium and nickel and combinations thereof.

14. The nanographitic composite of claim 1, wherein electroactive material comprises silicon.

15. The nanographitic composite of claim 14, wherein the silicon is present in a range from 5 wt % to 90 wt % of the composite.

16. The nanographitic composite of claim 14, wherein the silicon is present in a range from 40 wt % to 70 wt % of the composite.

17. The nanographitic composite of claim 14, wherein the silicon is present in a range from 30 wt % to 70 wt % of the composite.

18. The nanographitic composite of claim 5, wherein the LiF is present in a range from 2 wt % to 30 wt % of the composite.

19. The nanographitic composite of claim 1, wherein graphene is present in a range from 10 wt % to 40 wt % of the composite.

20. The nanographitic composite of claim 1, wherein the composite further comprises a conductive carbon additive.

21. The nanographitic composite of claim 20, wherein the conductive carbon additive is selected from the group consisting of carbon black, acetylene black, carbon nanotube, carbon fiber, carbon nanohorn, carbon nanocoil and combinations thereof.

22. The nanographitic composite of claim 1, wherein the electroactive particle is present in a range from 5 wt % to 90 wt % of the composite.

23. The nanographitic composite of claim 1, wherein the particles have a surface area is in the range of 50 to 200 m2/g.

24. An electrode for use as an anode in a lithium ion battery, said electrode comprising:
   (a) the nanographitic composite according to claim 1; and
   (b) a binder.

25. The electrode of claim 24, further comprising a conductive additive.

26. The electrode of claim 25, wherein the conductive additive comprises a graphene.

27. The electrode of claim 25, wherein the conductive additive is 2 to 20 wt % of the total electrode weight.

28. The electrode of claim 25, wherein the binder is 3 to 20 wt % of the total electrode weight.

29. A lithium ion battery comprising:
   an anode according to claim 24;
   a cathode; and
   an electrolyte disposed between and in ionic contact with the anode and the cathode.

30. A nanographitic composite for use as an anode in a lithium ion battery, comprising:
   a plurality of composite particles comprising:
   an electroactive particle;
   a coating layer comprising an inner layer of graphene nanoplatelets that have covalent bonding, formation of interdiffusion regions that contain both carbon and electroactive material, or a combination thereof to the electroactive particle and an outer layer of graphene nanoplatelets that are van der Waal bonded with the inner layer of graphene nanoplatelets, wherein the nanographitic platelets covers at least a portion of the nanoscale particle to form a nanographitic layer; and
   a solid electrolyte interface (SEI) modifier additive wherein the SEI modifier additive is a dry powder.

31. The nanographitic composite of claim 30, wherein the SEI modifier additive is preferentially disposed at the interface of the electroactive particle and the inner layer of graphene nanoplatelets.

32. The nanographitic composite of claim 30, wherein the SEI modifier additive is disposed in the outer layer of the graphene nanoplatelets surrounding the electroactive particle.

33. The nanographitic composite of claim 30, wherein the inner layer comprises a mixture of carbon, silicon and LiF.

34. The nanographitic composite of claim 30, wherein the inner layer is covalently bonded to the electroactive particle.

35. The nanographitic composite of claim 30, wherein the covalent bond is a pi-bond or a partial pi-bond.

36. The nanographitic composite of claim 30, wherein the inner layer is bonded to the electroactive particle by van der Waals bond.

37. The nanographitic composite of claim 30, wherein the graphene nanoplatelets-coated nanoscale particles form agglomerates.

38. The nanographitic composite of claim 30, wherein the coating layer comprises multiple layers of graphene nanoplatelets.

39. The nanographitic composite of claim 30, wherein the electroactive particle is one or more selected from the group consisting of silicon, tin, iron, magnesium, aluminum, lead, gold, silver, titanium, platinum, palladium, ruthenium, copper, nickel, rhodium and nickel and combinations thereof.

40. The nanographitic composite of claim 30, wherein electroactive particle comprises silicon.

41. The nanographitic composite of claim 40, wherein the silicon is present in a range from 10 wt % to 90 wt % of the composite.

42. The nanographitic composite of claim 40, wherein the composite further comprises a conductive carbon additive.

43. The nanographitic composite of claim 42, wherein the conductive carbon additive is selected from the group consisting of carbon black, acetylene black, carbon nanotube, carbon fiber, carbon nanohorn, carbon nanocoil and combinations thereof.

44. An electrode for use as an anode in a lithium ion battery, said electrode comprising:
   (a) the nanographitic composite according to claim 30; and
   (b) a binder.

45. The electrode of claim 44, further comprising a conductive additive.

46. The electrode of claim 44, wherein the conductive additive comprises a graphene.

47. The electrode of claim 44, wherein the conductive additive is 2 to 20 wt % of the total electrode weight.

48. The electrode of claim 44, wherein the binder is 3 to 20 wt % of the total electrode weight.

49. A lithium ion battery comprising:
   an anode according to claim 44;
   a cathode;
   a separator spacing apart the anode and the cathode; and
   an electrolyte in contact with the anode and the cathode.

* * * * *